J. E. WEBSTER.

RESILIENT CONNECTION.

APPLICATION FILED JUNE 25, 1910.

Reissued Nov. 8, 1910.

13,165.

2 SHEETS—SHEET 1.

WITNESSES:

C. L. Belcher

Otto S. Schairer

INVENTOR

John E. Webster

BY

Wesley B. Carr

ATTORNEY

J. E. WEBSTER.

RESILIENT CONNECTION.

APPLICATION FILED JUNE 25, 1910.

Reissued Nov. 8, 1910. 13,165.

2 SHEETS—SHEET 2.

WITNESSES:

C. L. Belcher

Otto S. Schairer

INVENTOR

John E. Webster

BY Shelby G. Carr

ATTORNEY

UNITED STATES PATENT OFFICE.

JOHN E. WEBSTER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

RESILIENT CONNECTION.

13,165. Specification of Reissued Letters Patent. Reissued Nov. 8, 1910.

Original No. 937,346, dated October 19, 1909, Serial No. 426,344. Application for reissue filed June 25, 1910. Serial No. 568,949.

*To all whom it may concern:*

Be it known that I, JOHN E. WEBSTER, a citizen of the United States, and a resident of Pittsburg, in the county of Allegheny and State of Pennsylvania, have invented a new and useful Improvement in Resilient Connections, of which the following is a specification.

My invention relates to means for resiliently and operatively connecting two members, such, for instance, as the driving wheels of electric railway vehicles and the rotatable members of the propelling motors thereof.

The object of my invention is to provide a resilient connection of the character indicated that shall possess great flexibility and be capable of sustaining large deflections in any direction and, at the same time, be exceptionally strong and durable.

Figure 1:
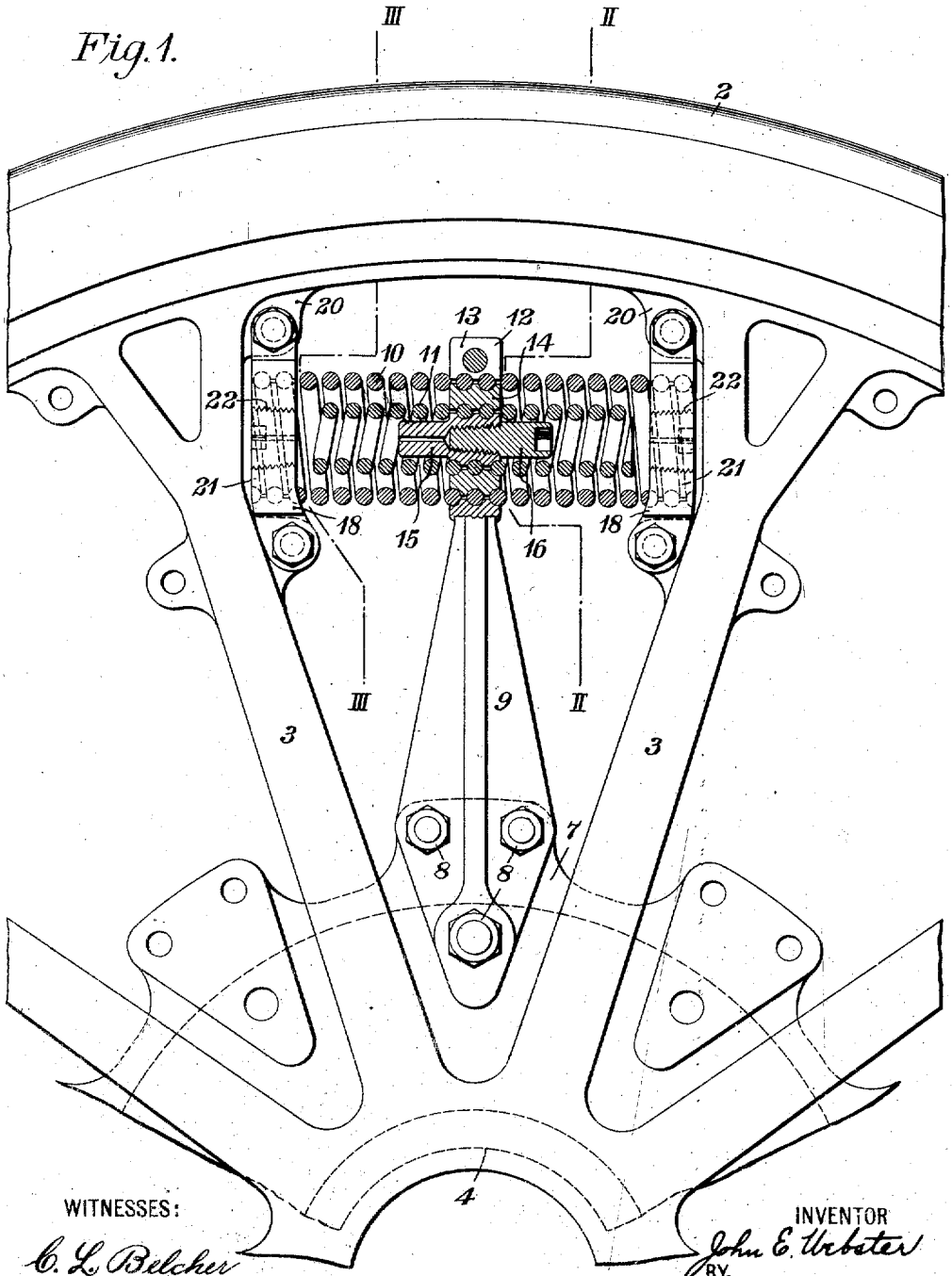
Figure 3:
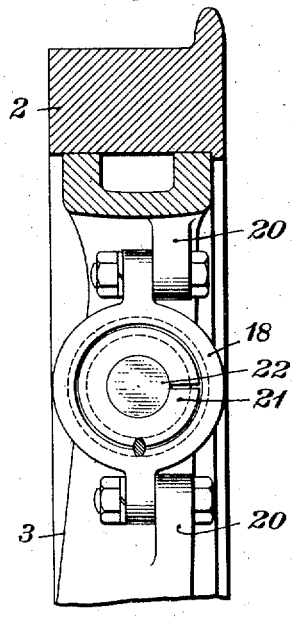
Figure 2:
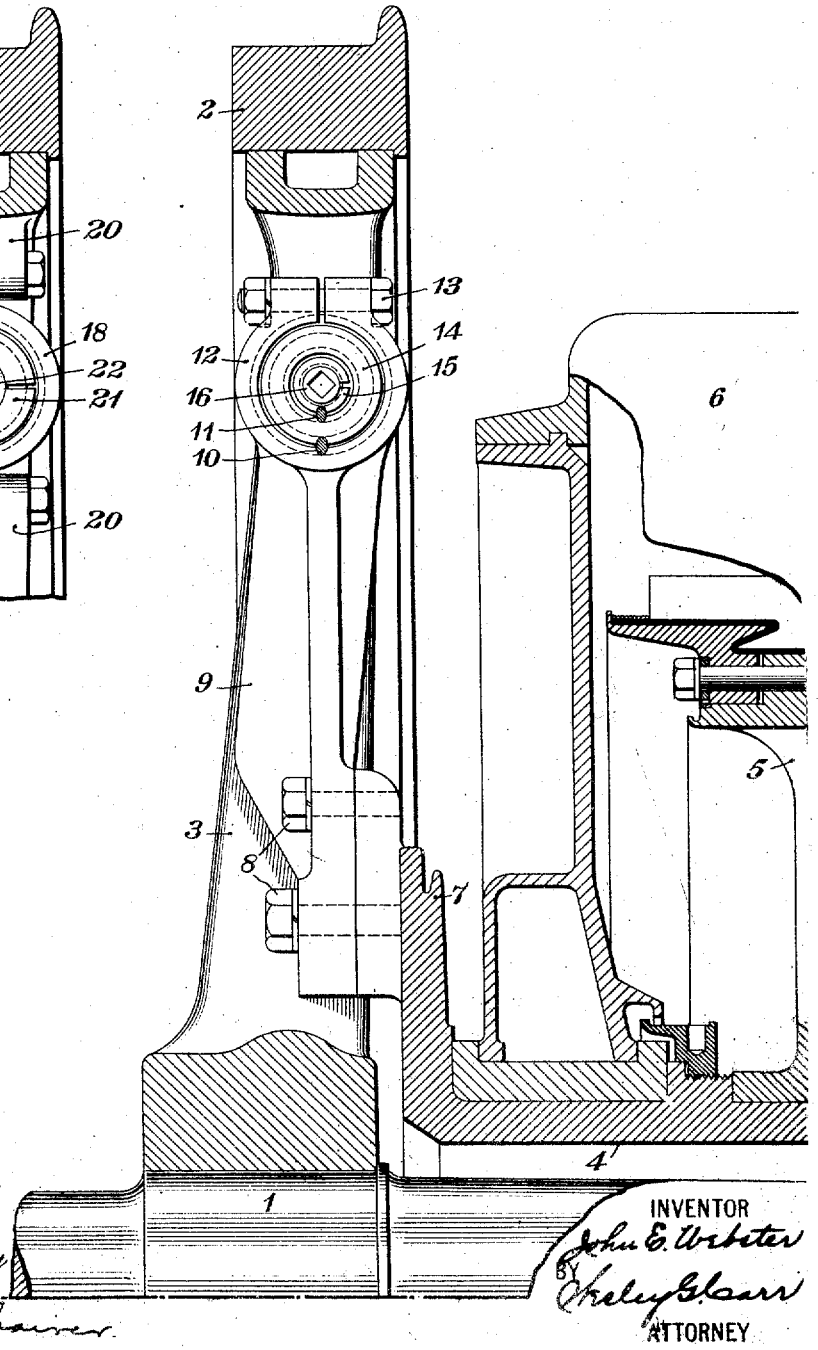

The invention is illustrated in the accompanying drawings, Figure 1 of which is a view in end elevation and in section of a portion of a wheel and the driving mechanism of a vehicle. Fig. 2 is a view in side elevation and in section on line II—II of Fig. 1, and Fig. 3 is also a view in side elevation and in section on line III—III of Fig. 1.

An axle 1, upon which is mounted a driving wheel 2 having a plurality of spokes 3, is surrounded by a quill 4 that carries the rotatable member 5 of a propelling motor 6 for the vehicle, the quill 4 being provided with an end flange 7 to which are secured, by means of bolts 8, arms 9 that extend outwardly between the spokes 3 of the driving wheel. Interposed between the spokes of the driving wheel, and secured intermediate their ends to the extremities of the arm 9, are a plurality of concentric helical springs 10 and 11, the outer spring 10 being of greater length than the spring 11 and being secured, at its ends, to the spokes 3. The means for securing the springs to the arm 9 comprises a split ring 12 formed integral with the arm 9 at its extremity and screw-threaded upon its inner circumferential face for the reception of the spring 10, a bolt 13 being provided for clamping the ring 12 upon the spring 10. Within the ring 12 and also within the spring 10 is another ring 14 that is screw-threaded upon its outer circumferential surface to permit of its being screwed into the spring 10 and also upon its inner circumferential surface to permit of its being screwed upon the spring 11. Within the ring 14 and also within the spring 11 is a screw-threaded split ring 15 into which is threaded a taper plug 16 for expanding the same and clamping the spring 11 between the rings 14 and 15, the ends of the members 15 and 16 being somewhat extended for the purpose of limiting the lateral deflections to which the spring 11 may be subjected by centrifugal forces.

The means for securing the ends of the spring 10 to the driving wheel comprises rings 18 that are bolted to lugs 20 formed integral with the spokes 3, and are screw-threaded upon their inner circumferential faces to permit of their being screwed upon the ends of the helical spring 10. Within the rings 18, and also within the springs 10, are split rings 21 that are adapted to be expanded, for the purpose of clamping the ends of the springs 10 between the same and the rings 18, by means of screw-threaded taper plugs 22.

The spring 10 alone receives the normal forces exerted longitudinally of its axis between the arms 9 and the driving wheel, and to that end it is provided with a materially greater degree of flexibility than the inner spring 11 which is brought into action only when the forces exerted between the connected members exceed the normal or other predetermined values. The advantage of this arrangement is, that the spring 10 may be so designed that the stresses to which it will be subjected will be much lower than the maximum stresses which the material is capable of sustaining, with the result that the spring will be very durable in service. Since the spring 11 is brought into play only under abnormal conditions, which are likely to occur only infrequently, the said spring will also be very durable. It follows, therefore, that the combination possesses great flexibility and strength. As the end convolutions of the spring 10 are clamped between the members 18 and 21, the former of which is rigidly secured to the spokes 3, and, as the intermediate convolutions are rigidly clamped in a similar manner to the arm 9, the spring is capable of sustaining and resiliently opposing deflections transversely of its axis as well as both compressive and tensile strains. Thus the construction and arrangement of the parts is such that the spring 10 is subjected to universal use, but is relieved of the extraordinary shocks transmitted between the wheel 2 and the quill 4.

I claim as my invention:

1. The combination with two relatively movable members, of a helical spring secured at its ends to one of the members and intermediate its ends to the other member, and another helical spring also secured intermediate its ends to the latter member and the extremities of which do not normally engage the former member.

2. The combination with two relatively movable members, of a helical spring secured at its ends to one of the members and intermediate its ends to the other member, and another spring also secured intermediate its ends to the latter member.

3. The combination with two relatively movable members, of a helical spring secured at its ends to one of the members and intermediate its ends to the other member, and another spring possessing a different degree of flexibility also secured intermediate its ends to the latter member.

4. The combination with two relatively movable members, of a helical spring secured at its ends to one of the members and intermediate its ends to the other member, of another spring possessing a lesser degree of flexibility and also secured intermediate its ends to the latter member.

5. The combination with two relatively movable members, of a plurality of concentric helical springs of different lengths secured intermediate their ends to one of the members, and means for securing the extremities of the longer spring to the other member.

6. The combination with two relatively movable members, of a plurality of concentric helical springs of different lengths, clamping devices applied to the springs intermediate their ends for securing the same to one of the members, and clamping devices applied to the ends of the longer spring for securing the same to the other member.

7. The combination with two relatively movable members, of a plurality of concentric helical springs of different lengths and different degrees of flexibility, means for securing the springs intermediate their ends to one of the members, and means for securing the extremities of the longer spring to the other member.

8. The combination with two relatively movable members, of a plurality of concentric helical springs of different lengths, concentric rings applied to the ends of the longer spring, means securing one of the rings at each end of the spring to one of the members, concentric rings applied to the springs intermediate their ends, one of which is carried by the other member, and means for clamping the springs between the concentric rings.

9. The combination with a vehicle wheel and a driving member, of a helical spring secured at its ends to the wheel, and intermediate its ends to the driving member, and another spring secured intermediate its ends to the driving member and the extremities of which do not normally engage the wheel.

10. The combination with a vehicle wheel and a driving member, of a helical spring secured at its ends to the wheel, and intermediate its ends to the driving member, and another spring possessing a different degree of flexibility secured intermediate its ends to the driving member and the extremities of which do not normally engage the wheel.

11. The combination with two concentrically mounted rotatable members, of an interposed helical spring and means for circumferentially gripping convolutions of said spring and clamping the same rigidly to the respective members.

12. The combination with two concentrically mounted rotatable members, of a plurality of interposed helical springs, and means for circumferentially gripping convolutions of each spring and rigidly clamping the same to the respective members.

13. The combination with a driving member and a driven member each of which has substantially radial arms or spokes, of helical springs interposed between adjacent arms or spokes of the respective members, and clamps which circumferentially grip convolutions of said springs.

14. The combination with an electric motor having arms projecting radially from its rotatable member, of a wheel having spokes which alternate in position with said radial arms, helical springs interposed between said arms and said spokes, and clamps which circumferentially grip certain convolutions of said springs both interiorly and exteriorly and rigidly fasten the same to said arms and spokes.

15. The combination with a rotatable driving member and a concentrically mounted rotatable driven member, of a plurality of uniformly spaced helical springs interposed between said members, and clamping devices for circumferentially gripping convolutions of each spring and anchoring the same securely to the respective members.

16. The combination with two relatively movable members, of an interposed helical spring, and means for circumferentially gripping convolutions of said spring and clamping the same to the respective members.

In testimony whereof, I have hereunto subscribed my name this 17th day of June 1910.

JOHN E. WEBSTER.

Witnesses:
B. B. HINES,
M. C. MERZ.